(12) United States Patent
Matsui et al.

(10) Patent No.: US 10,193,598 B2
(45) Date of Patent: Jan. 29, 2019

(54) COMMUNICATION APPARATUS, POWER RECEIVING APPARATUS, AND ANTENNA SWITCHING METHOD

(71) Applicant: Sony Corporation, Tokyo (JP)

(72) Inventors: Ken Matsui, Kanagawa (JP); Masayoshi Abe, Tokyo (JP); Osamu Kozakai, Kanagawa (JP); Hirofumi Kawamura, Tokyo (JP); Hiroaki Fujita, Kanagawa (JP); Takashi Miyamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/560,718

(22) PCT Filed: Apr. 12, 2016

(86) PCT No.: PCT/JP2016/061804
§ 371 (c)(1),
(2) Date: Sep. 22, 2017

(87) PCT Pub. No.: WO2016/171037
PCT Pub. Date: Oct. 27, 2016

(65) Prior Publication Data
US 2018/0091194 A1    Mar. 29, 2018

(30) Foreign Application Priority Data

Apr. 24, 2015  (JP) .................................. 2015-089108

(51) Int. Cl.
*H04B 5/02*     (2006.01)
*G06K 19/07*    (2006.01)
*G06K 19/073*   (2006.01)
*G06K 19/077*   (2006.01)
*H04B 7/08*     (2006.01)
*H02J 7/02*     (2016.01)
*H02J 50/10*    (2016.01)

(52) U.S. Cl.
CPC ............... *H04B 5/02* (2013.01); *G06K 19/07* (2013.01); *G06K 19/073* (2013.01); *G06K 19/077* (2013.01); *H04B 7/08* (2013.01); *H02J 7/025* (2013.01); *H02J 50/10* (2016.02)

(58) Field of Classification Search
CPC .................................... H04B 5/02; H04B 7/08
See application file for complete search history.

(56) References Cited

U.S. PATENT DOCUMENTS

2005/0068009 A1    3/2005  Aoki
2015/0222141 A1*   8/2015  Yamazaki ............... G06F 1/26
                                                    320/103

FOREIGN PATENT DOCUMENTS

| JP | 04-274625 A | 9/1992 |
| JP | 2005-110399 A | 4/2005 |
| JP | 2006-304039 A | 11/2006 |
| JP | 2011-239340 A | 11/2011 |

(Continued)

*Primary Examiner* — Tuan H Nguyen
(74) *Attorney, Agent, or Firm* — Michael Best & Friedrich LLP

(57) ABSTRACT

A communication apparatus according to the disclosure includes one or a plurality of sensors, a communicator that performs proximity wireless communication, and a connection section that couples one of a plurality of antennae to the communicator, on a basis of a detection result of the one or the plurality of sensors.

18 Claims, 12 Drawing Sheets

(56) References Cited

FOREIGN PATENT DOCUMENTS

| JP | 2013-191913 A | 9/2013 |
|----|---------------|--------|
| WO | 2015/037401 A1 | 3/2015 |

* cited by examiner

[ FIG. 1 ]
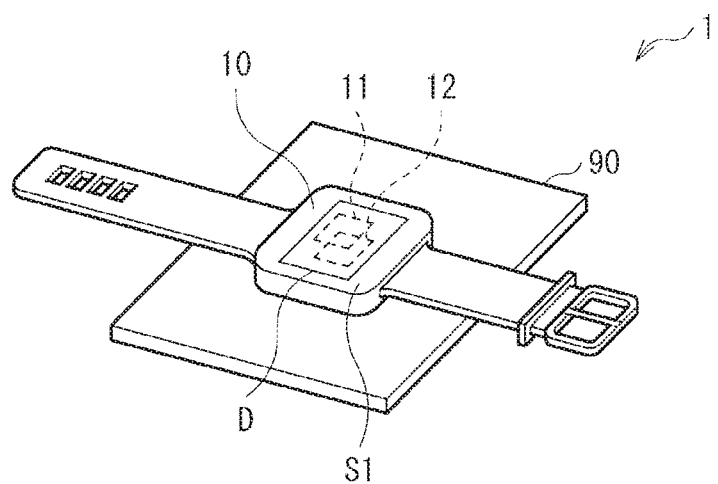
[ FIG. 2 ]
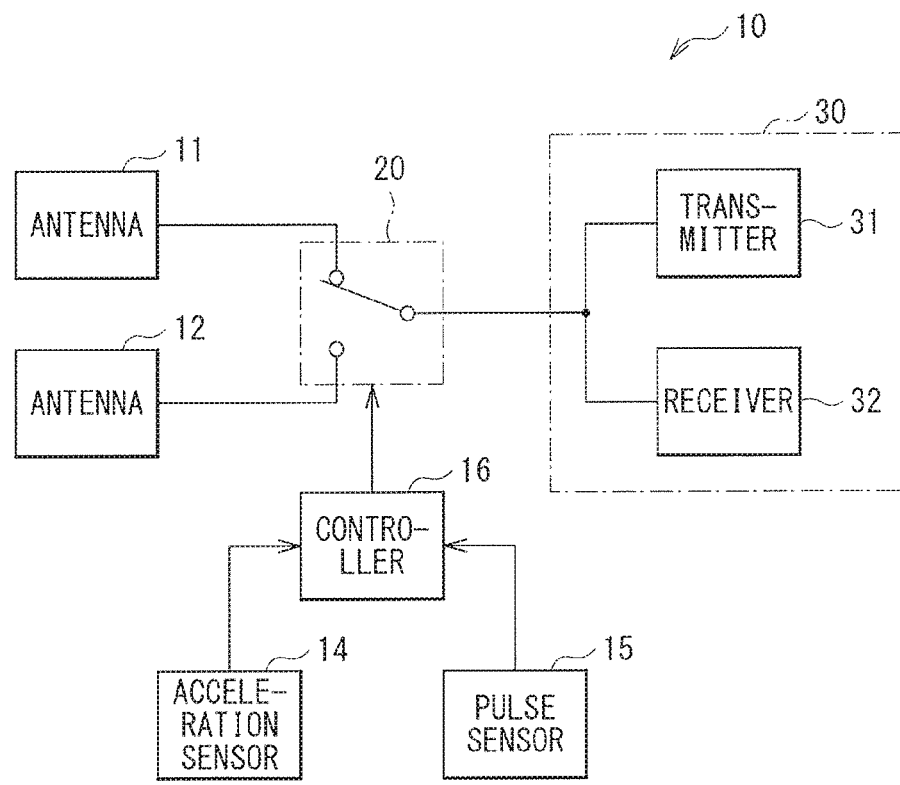

[ FIG. 3 ]
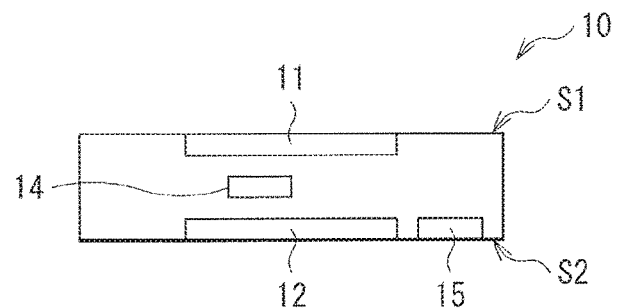
[ FIG. 4 ]
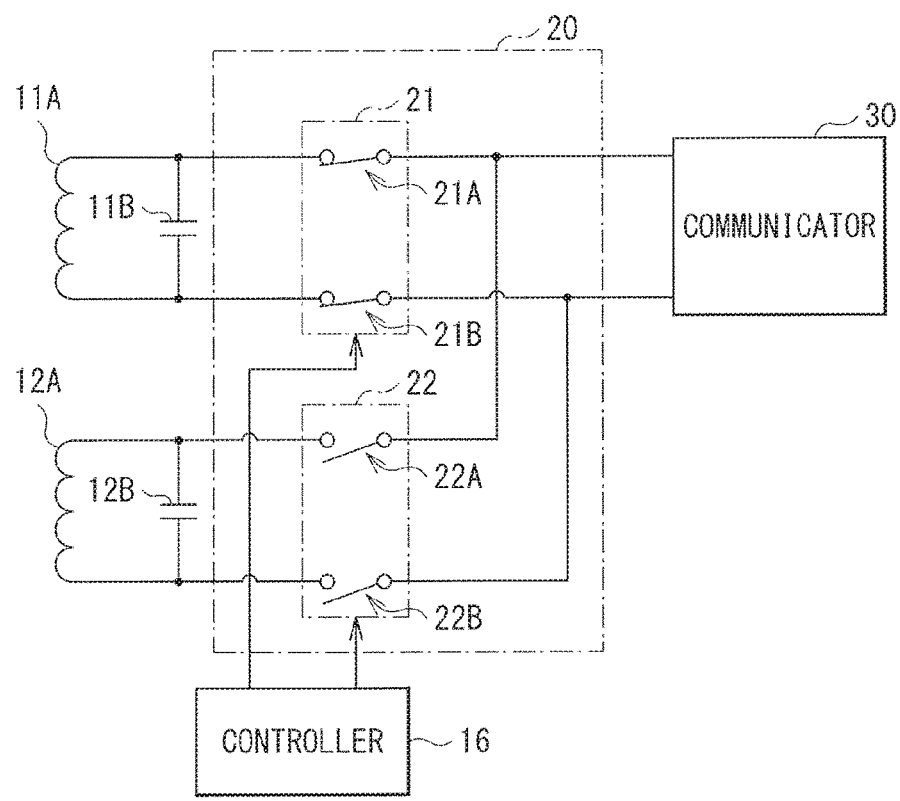

[ FIG. 5 ]
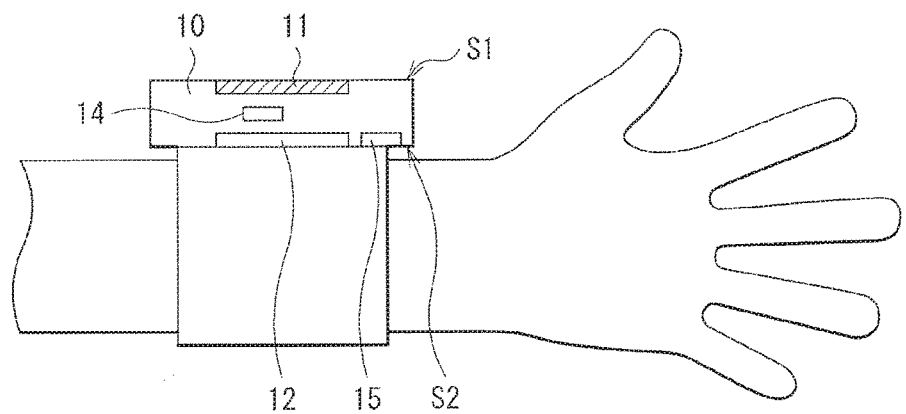
[ FIG. 6 ]
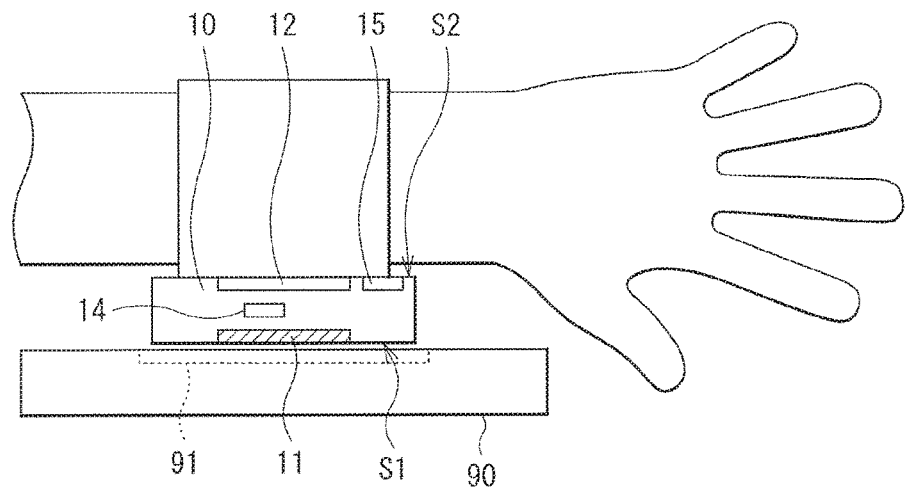

[ FIG. 7A ]
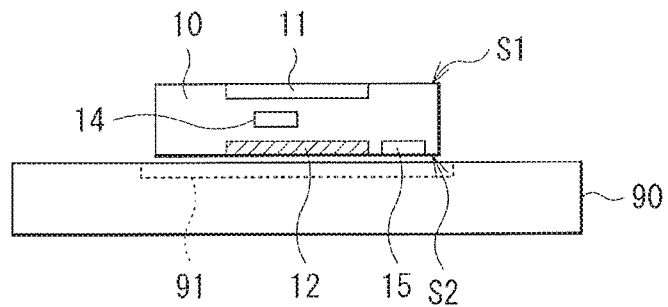
[ FIG. 7B ]
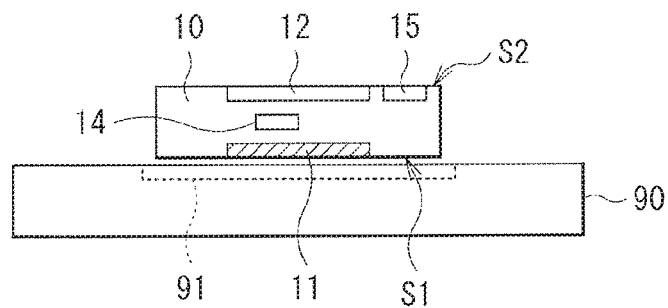
[ FIG. 8 ]
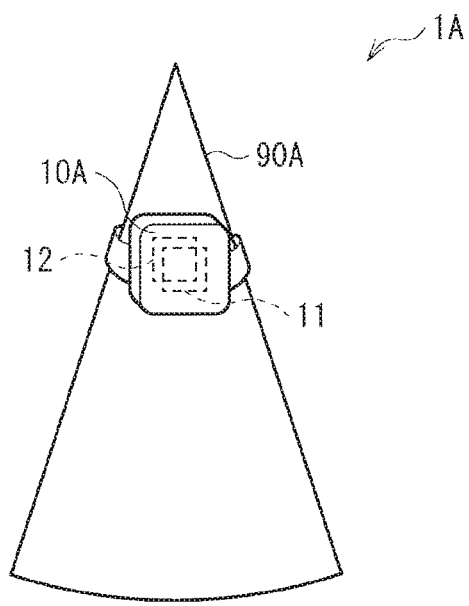

[ FIG. 9 ]
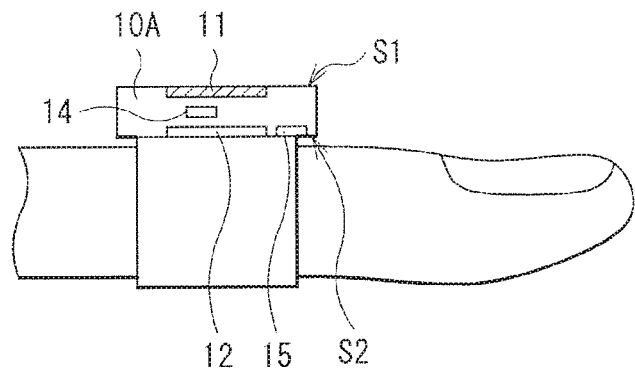
[ FIG. 10 ]
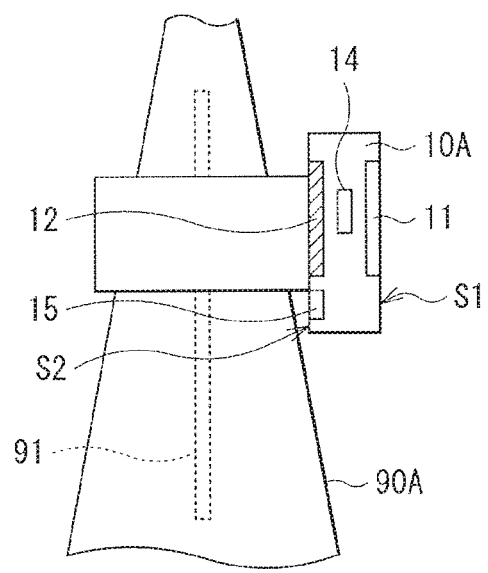

[ FIG. 11 ]
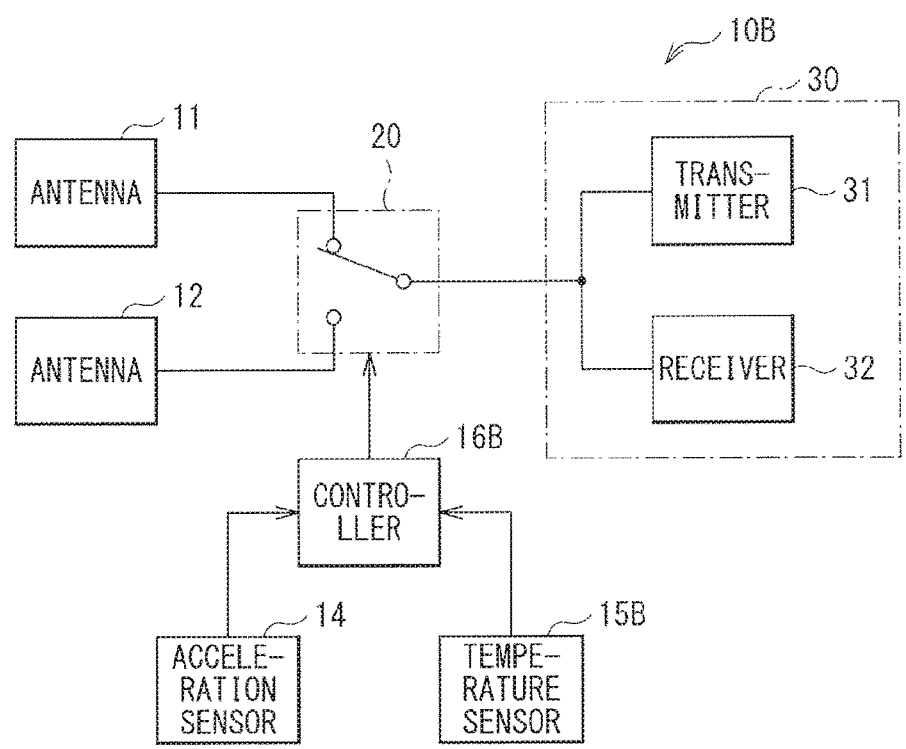

[ FIG. 12 ]
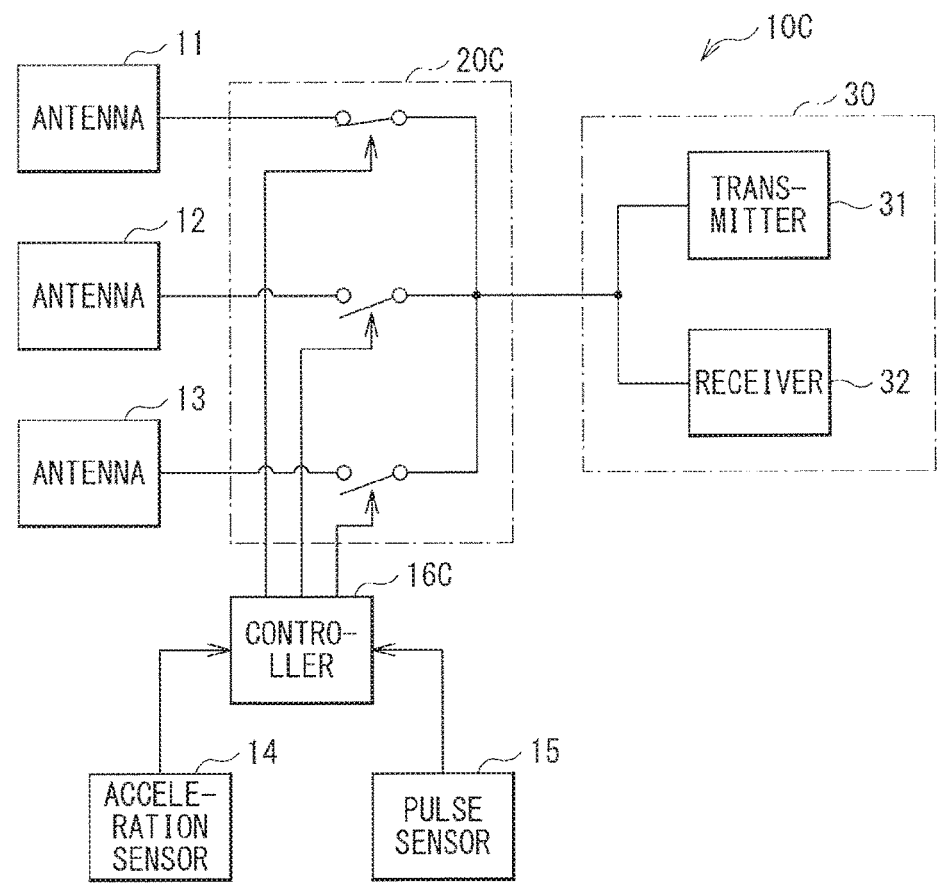

[ FIG. 13 ]
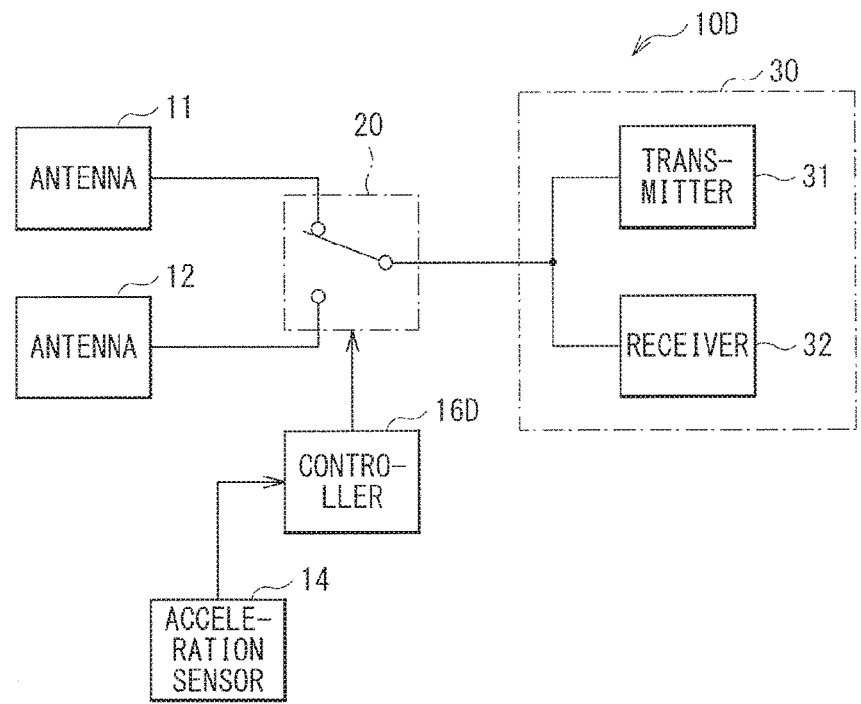
[ FIG. 14 ]
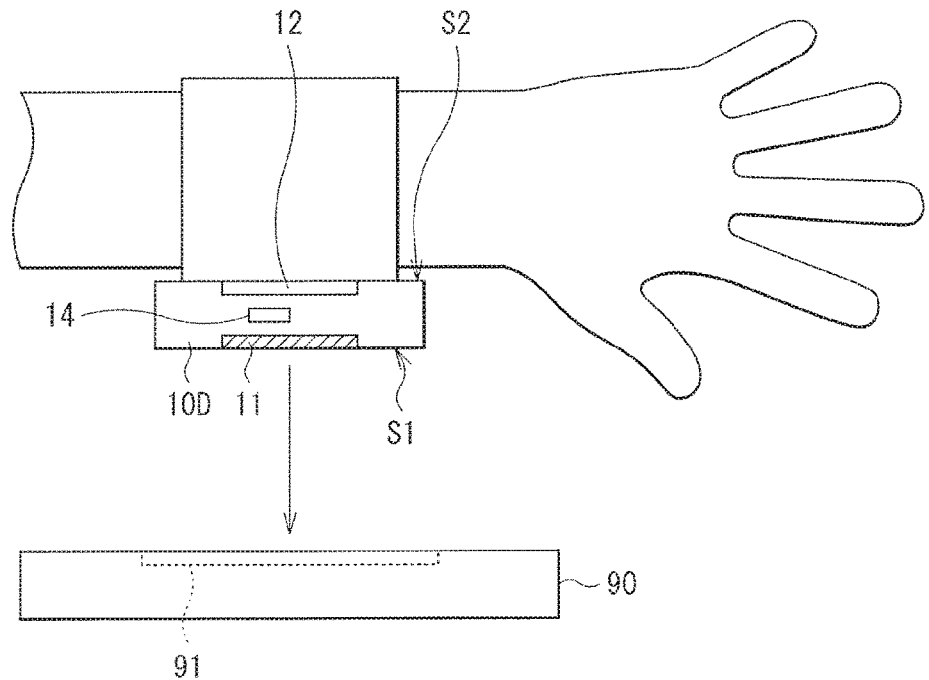

[ FIG. 15 ]
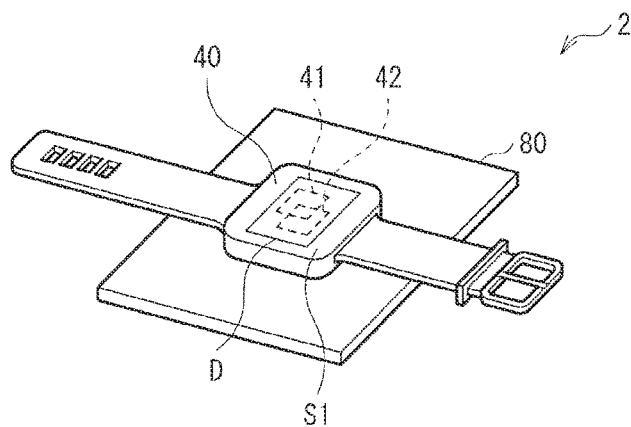
[ FIG. 16 ]
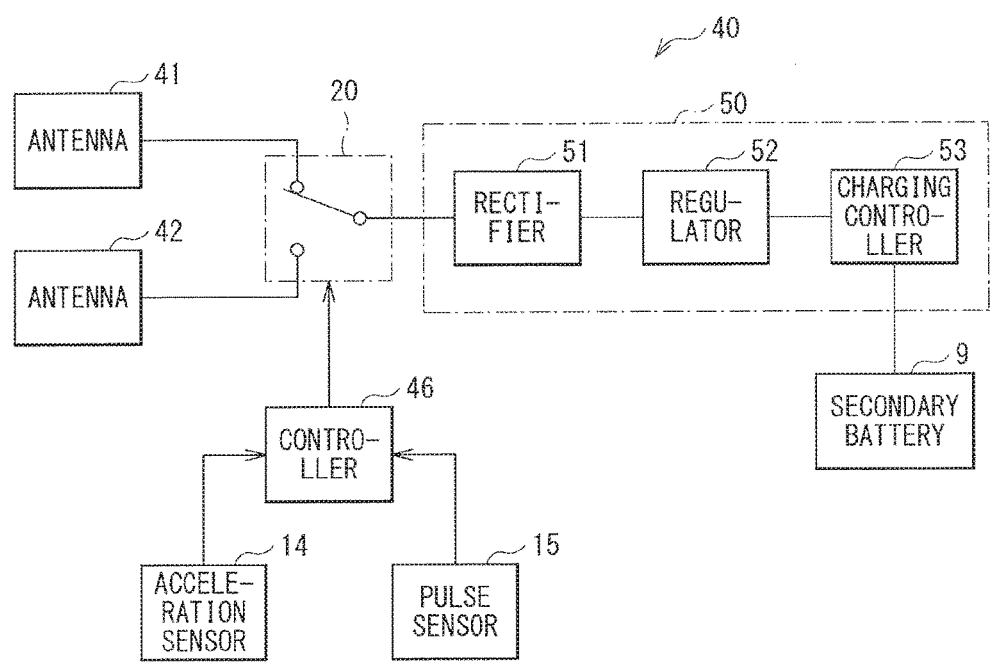

[ FIG. 17A ]
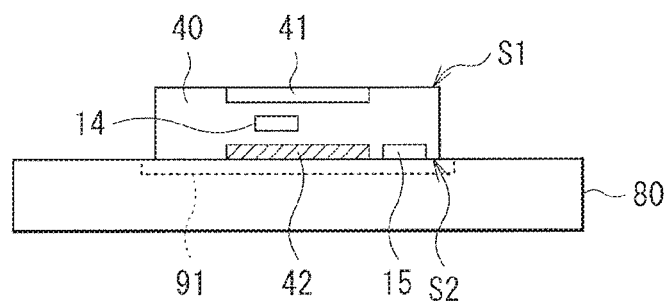
[ FIG. 17B ]
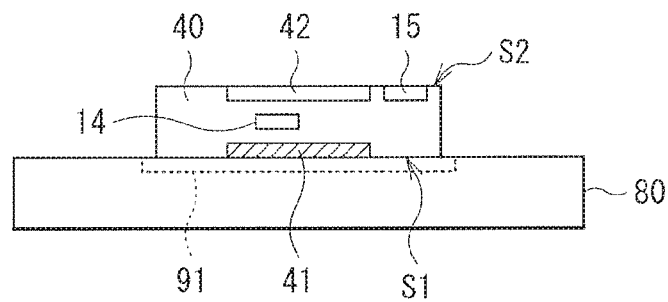

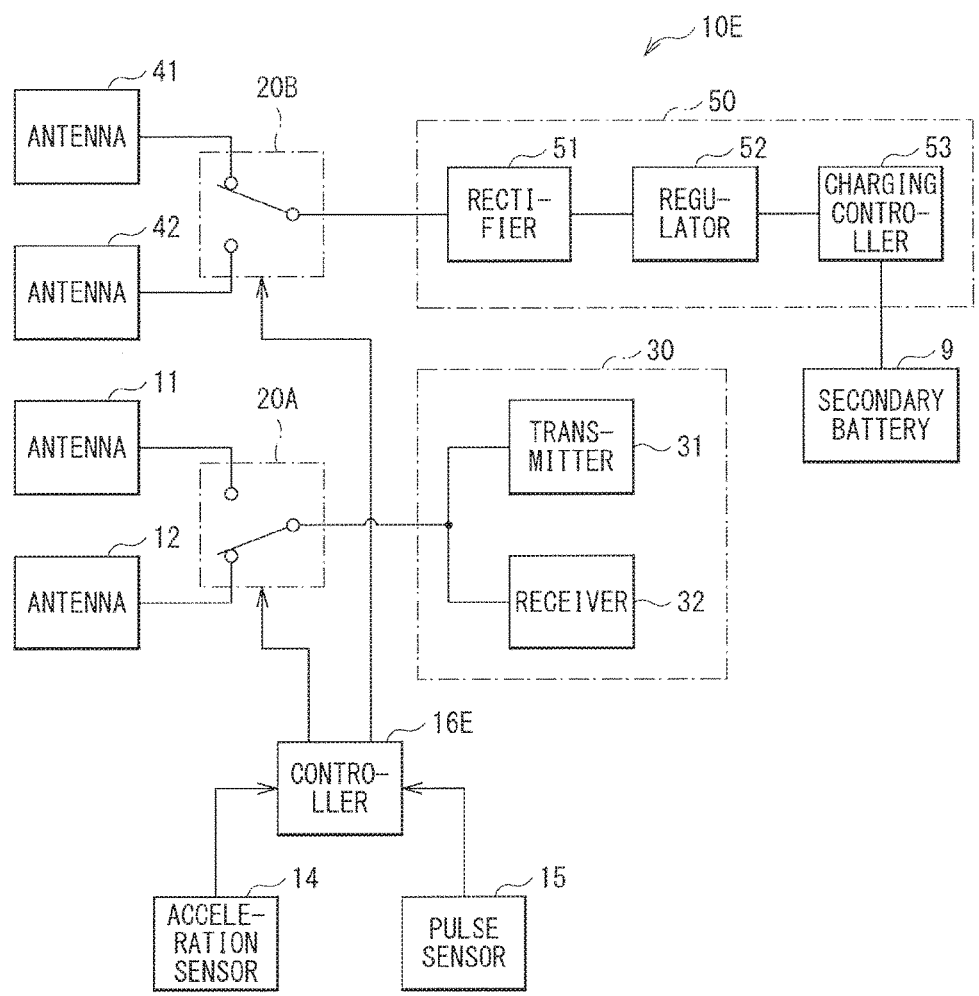
[ FIG. 18 ]

[ FIG. 19 ]
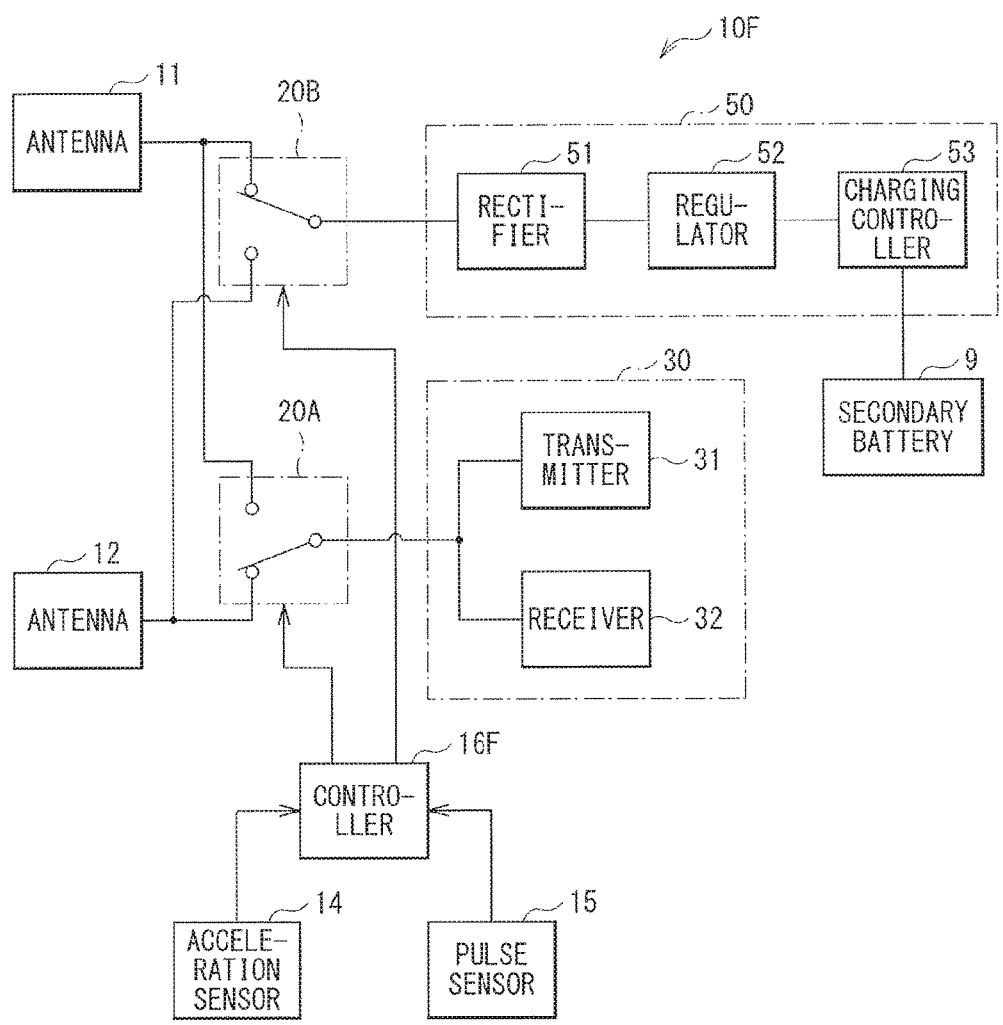

US 10,193,598 B2

COMMUNICATION APPARATUS, POWER RECEIVING APPARATUS, AND ANTENNA SWITCHING METHOD

TECHNICAL FIELD

The disclosure relates to a communication apparatus that performs exchange of information through proximity wireless communication, a power receiving apparatus that wirelessly receives power, and an antenna switching method to be used in such an apparatus.

BACKGROUND ART

In recent years, proximity wireless communication attracts attention in which communication is performed between electronic apparatuses that are disposed in proximity to each other. One of such proximity wireless communication is near field communication (NFC: Near Field Communication). The near field communication becomes popular mainly throughout Asia in fields of traffic system, charging, authentication, etc.

Incidentally, there is a power feeding system that wirelessly feeds power to an electronic apparatus. In such a power feeding system as well, for example, placing the electronic apparatus on a power feeding tray allows for charge of a battery in the electronic apparatus.

In the communication system and the power feeding system performing the proximity wireless communication, an antenna is used. For example, PTL 1 discloses a wireless charging circuit that uses, in wireless power feeding, an antenna used in the proximity wireless communication. In addition, for example, PTL 2 discloses a communication apparatus that performs communication with use of one of a plurality of antennae.

CITATION LIST

Patent Literature

PTL 1: Japanese Unexamined Patent Application Publication No. 2013-191913
PTL 2: Japanese Unexamined Patent Application Publication No. H4-274625

SUMMARY OF INVENTION

As for an electronic apparatus, enhancement of convenience of a user is typically desired and further improvement of convenience is expected.

Accordingly, it is desirable to provide a communication apparatus, a power receiving apparatus, and an antenna switching method that make it possible to enhance convenience of a user.

A communication apparatus according to an embodiment of the disclosure includes one or a plurality of sensors, a communicator, and a connection section. The communicator performs proximity wireless communication. The connection section couples one of a plurality of antennae to the communicator, on a basis of a detection result of the one or the plurality of sensors.

A power receiving apparatus according to an embodiment of the disclosure includes one or a plurality of sensors, a power receiver, and a connection section. The power receiver wirelessly receives power. The connection section couples one of a plurality of antennae to the power receiver, on a basis of a detection result of the one or the plurality of sensors.

An antenna switching method according to an embodiment of the disclosure includes operating one or a plurality of sensors, and coupling, on a basis of a detection result of the one or the plurality of sensors, one of a plurality of antennae to a communicator that performs proximity wireless communication.

In the communication apparatus and the antenna switching method according to the respective embodiments of the disclosure, one of the plurality of antennae is coupled to the communicator hat performs the proximity wireless communication. At this time, one of the plurality of antennae is coupled to the communicator, on the basis of the detection result of the one or the plurality of sensors.

In the power receiving apparatus according to the embodiment of the disclosure, one of the plurality of antennae is coupled to the power receiver that wirelessly receives power. At this time, one of the plurality of antennae is coupled to the power receiver, on the basis of the detection result of the one or the plurality of sensors.

In the communication apparatus and the antenna switching method according to the respective embodiments of the disclosure, one of the plurality of antennae is coupled to the communicator, on the basis of the detection result of the one or the plurality of sensors. Hence, it is possible to enhance convenience of a user.

In the power receiving apparatus according to the embodiment of the disclosure, one of the plurality of antennae is coupled to the power receiver, on the basis of the detection result of the one or the plurality of sensors. Hence, it is possible to enhance convenience of a user.

Note that effects described here are not necessarily limiting. Effects to be achieved by the technology may be one or more of effects described in the present disclosure.

BRIEF DESCRIPTION OF DRAWINGS

FIG. 1 is a perspective view illustrating a configuration example of a communication system according to an embodiment of the disclosure.
FIG. 2 is a block diagram illustrating a configuration example of a communication mechanism in an electronic apparatus illustrated in FIG. 1.
FIG. 3 is an explanatory diagram illustrating a cross-sectional structure of a main part of the electronic apparatus illustrated in FIG. 2.
FIG. 4 is a circuit diagram illustrating a configuration example of antennae and switch sections illustrated in FIG. 2.
FIG. 5 is an explanatory diagram illustrating an operation example of the electronic apparatus illustrated in FIG. 2.
FIG. 6 is another explanatory diagram illustrating another operation example of the electronic apparatus illustrated in FIG. 2.
FIG. 7A is an explanatory diagram illustrating another operation example of the electronic apparatus illustrated in FIG. 2.
FIG. 7B is an explanatory diagram illustrating another operation example of the electronic apparatus illustrated in FIG. 2.
FIG. 8 is a perspective view illustrating a configuration example of a communication system according to a modification.
FIG. 9 is an explanatory diagram illustrating an operation example of an electronic apparatus illustrated in FIG. 8.

FIG. 10 is an explanatory diagram illustrating another operation example of the electronic apparatus illustrated in FIG. 8.

FIG. 11 is a block diagram illustrating a configuration example of an electronic apparatus according to another modification.

FIG. 12 is a block diagram illustrating a configuration example of an electronic apparatus according to another modification.

FIG. 13 is a block diagram illustrating a configuration example of an electronic apparatus according to another modification.

FIG. 14 is an explanatory diagram illustrating an operation example of the electronic apparatus illustrated in FIG. 13.

FIG. 15 is a perspective view illustrating a configuration example of a power feeding system according to another modification.

FIG. 16 is a block diagram illustrating a configuration example of a power receiving mechanism in an electronic apparatus illustrated in FIG. 15.

FIG. 17A is an explanatory diagram illustrating an operation example of the electronic apparatus illustrated in FIG. 16.

FIG. 17B is an explanatory diagram illustrating another operation example of the electronic apparatus illustrated in FIG. 16.

FIG. 18 is a block diagram illustrating a configuration example of an electronic apparatus according to another modification.

FIG. 19 is a block diagram illustrating a configuration example of an electronic apparatus according to another modification.

DESCRIPTION OF EMBODIMENTS

Some embodiments of the disclosure are described in detail below with reference to drawings.
[Configuration Example]
FIG. 1 is a diagram illustrating a configuration example of a communication system (a communication system 1) including a communication apparatus according to an embodiment. The communication system 1 is a communication system that performs proximity wireless communication. Note that an antenna switching method according to an embodiment of the disclosure is embodied by the present embodiment, and is accordingly described together.

The communication system 1 includes an electronic apparatus 10 and a communication apparatus 90. The electronic apparatus 10 in this example is a so-called wearable apparatus of a wrist band type. In this example, the electronic apparatus 10 includes a display section D, and is disposed on the communication apparatus 90 such that a surface S1 provided with the display section D faces up. The electronic apparatus 10 includes two antennae 11 and 12 in this example. The antennae 11 and 12 are coupled to an antenna 91 (described later) of the communication apparatus 90 through a magnetic field. The electronic apparatus 10 selectively uses one of the two antennae 11 and 12, thereby performing communication with the communication apparatus 90.

FIG. 2 is a diagram illustrating a configuration example of a communication mechanism in the electronic apparatus 10. The electronic apparatus 10 includes, in addition to the two antennae 11 and 12, an acceleration sensor 14, a pulse sensor 15, a controller 16, a connection section 20, and a communicator 30.

FIG. 3 is a diagram illustrating a cross-sectional structure of a main part of the electronic apparatus 10. FIG. 4 is a diagram illustrating a configuration example of the antennae 11 and 12 and the connection section 20. The electronic apparatus 10 includes coils 11A and 12A and capacitors 11B and 12B.

As illustrated in FIG. 3, the antenna 11 is disposed on the surface S1 of the electronic apparatus 10, and the antenna 12 is disposed on a surface S2 opposite to the surface S1. The surface S2 is a surface that comes into contact with the communication apparatus 90 when the electronic apparatus 10 is disposed on the communication apparatus 90 as illustrated in FIG. 1. Further, in a case where a user wears the electronic apparatus 10, the surface S2 comes into contact with or comes close to the user.

The coil 11A (FIG. 4) functions as the antenna 11. One end of the coil 11A is coupled to one end of the capacitor 11B and one end of a switch 21A (described later), and the other end thereof is coupled to the other end of the capacitor 11B and one end of a switch 21B (described later). The one end of the capacitor 11B is coupled to the one end of the coil 11A and the one end of the switch 21A (described later), and the other end thereof is coupled to the other end of the coil 11A and the one end of the switch 21B (described later).

The coil 12A functions as the antenna 12. One end of the coil 12A is coupled to one end of the capacitor 12B and one end of a switch 22A (described later), and the other end thereof is coupled to the other end of the capacitor 12B and one end of a switch 22B (described later). The one end of the capacitor 12B is coupled to the one end of the coil 12A and the one end of the switch 22A (described later), and the other end thereof is coupled to the other end of the coil 12A and the one end of the switch 223 (described later).

The acceleration sensor 14 (FIG. 2) detects an orientation and motion of the electronic apparatus 10. The pulse sensor 15 detects the pulse of the user wearing the electronic apparatus 10, thereby detecting that the electronic apparatus 10 is in contact with or in proximity to the user. As illustrated in FIG. 3, the pulse sensor 15 is disposed on the surface S2.

The controller 16 (FIG. 2) controls the connection section 20, on the basis of detection results of the acceleration sensor 14 and the pulse sensor 15. Specifically, the controller 16 determines whether the user wears the electronic apparatus 10, on the basis of the detection results of the acceleration sensor 14 and the pulse sensor 15. In a case where the user wears the electronic apparatus 10, the controller 16 controls the connection section 20 to couple the antenna 11 disposed on the surface S1 to the communicator 30 in contrast, in a case where the user does not wear the electronic apparatus 10, the controller 16 controls the connection section 20 to couple the lower antenna of the antennae 11 and 12 to the communicator 30, on the basis of the detection result of the acceleration sensor 14.

The connection section 20 couples one of the antennae 11 and 12 to the communicator 30 on the basis of instruction from the controller 16. As illustrated in FIG. 4, the connection section 20 includes a switch section 21 and a switch section 22.

The switch section 21 includes the switches 21A and 21B. The one end of the switch 21A is coupled to the one end of the coil 11A and the one end of the capacitor 11B, and the other end thereof is coupled to the other end of the switch 22A and a first terminal of the communicator 30. The one end of the switch 21B is coupled to the other end of the coil 11A and the other end of the capacitor 11B, and the other end thereof is coupled to the other end of the switch 22B and a second terminal of the communicator 30.

The switch section 22 includes the switches 22A and 22B. The one end of the switch 22A is coupled to the one end of the coil 12A and the one end of the capacitor 12B, and the other end thereof is coupled to the other end of the switch 21A and the first terminal of the communicator 30. The one end of the switch 223 is coupled to the other end of the coil 12A and the other end of the capacitor 12B, and the other end thereof is coupled to the other end of the switch 213 and the second terminal of the communicator 30.

With this configuration, the connection section 20 turns on the switches 214 and 21B and turns off the switches 22A and 22B in a case of coupling the coil 11A (the antenna 11) and the communicator 30 together. In addition, the connection section 20 turns on the switches 224 and 22B and turns off the switches 21A and 21B in a case of coupling the coil 12A (the antenna 12) and the communicator 30 together.

The communicator 30 (FIG. 2) includes a transmitter 31 and a receiver 32. The transmitter 31 transmits a data signal to the communication apparatus 90 through one of the antennae 11 and 12. The receiver 32 receives a data signal that is transmitted from the communication apparatus 90 through one of the antennae 11 and 12.

Here, the acceleration sensor 14 and the pulse sensor 15 correspond to a specific example of "one or a plurality of sensors" of the disclosure. The antenna 12 corresponds to a specific example of a "first antenna" of the disclosure. The pulse sensor 15 corresponds to a specific example of a "first sensor" of the disclosure. The acceleration sensor 14 corresponds to a specific example of a "second sensor" of the disclosure.

[Operation and Working]

Subsequently, an operation and working of the communication system 1 according to the present embodiment are described.

[Outline of Entire Operation]

First, an outline of enter operation of the communication system 1 is described with reference to FIG. 2. The antennae 11 and 12 are coupled to the antenna of the communication apparatus 90 through a magnetic field. The acceleration sensor 14 detects the orientation and the motion of the electronic apparatus 10. The pulse sensor 15 detects the pulse of the user wearing the electronic apparatus 10, thereby detecting that the electronic apparatus 10 is in contact with or in proximity to the user. The controller 16 controls the connection section 20, on the basis of detection results of the acceleration sensor 14 and the pulse sensor 15. The connection section 20 couples one of the antennae 11 and 12 to the communicator 30, on the basis of the instruction from the controller 16. The transmitter 31 of the communicator 30 transmits a data signal to the communication apparatus 90 through one of the antennae 11 and 12. The receiver 32 of the communicator 30 receives a data signal that is transmitted from the communication apparatus 90 through one of the antennae 11 and 12.

[Detailed Operation]

The controller 16 of the electronic apparatus 10 controls the connection section 20, on the basis of the detection results of the acceleration sensor 14 and the pulse sensor 15. Some examples of the operation of the electronic apparatus 10 are described below.

FIG. 5 is a diagram illustrating an operation of the electronic apparatus 10 in the case where the user wears the electronic apparatus 10. The hatched antenna. indicates the antenna selected by the controller 16.

In this example, the user wears the electronic apparatus 10. At this time, the surface S2 is in contact with or in proximity to the user. The controller 16 determines whether the user wears the electronic apparatus 10, on the basis of the detection results of the acceleration sensor 14 and the pulse sensor 15. In this example, the acceleration sensor 14 detects that the electronic apparatus 10 is not stationary but is moving. Further, the pulse sensor 15 detects that the surface S2 of the electronic apparatus 10 is in contact with or in proximity to the user. The controller 16 determines that the user wears the electronic apparatus 10, on the basis of these detection results. Accordingly, the controller 16 selects the antenna 11 disposed on the surface S1, as the antenna to be used. Further, the controller 16 controls the connection section 20 to couple the antenna 11 and the communicator 30 together.

FIG. 6 is a diagram illustrating an operation of the electronic apparatus 10 when the electronic apparatus 10 is held over the communication apparatus 90 in the case where the user wears the electronic apparatus 10. At this time, as described above, the antenna 11 is selected in the electronic apparatus 10. Therefore, the antenna 11 of the electronic apparatus 10 is coupled to the antenna 91 of the communication apparatus 90 through a magnetic field. This causes the communicator 30 of the electronic apparatus 10 to perform communication with the communication apparatus 90 through the antenna 11.

As described above, in the case where the user wears the electronic apparatus 10, the electronic apparatus 10 selects the antenna 11 disposed on the surface S1, as the antenna to be used. More specifically, since the surface S2 is in contact with or in proximity to the user, it is difficult for the surface S2 to come into contact with or come close to the communication apparatus 90. In other words, it is difficult for the antenna 12 disposed on the surface S2 to be coupled to the antenna 91 of the communication apparatus 90 through a magnetic field. Therefore, in the case where the user wears the electronic apparatus 10, the electronic apparatus 10 selects the antenna 11 disposed on the surface S1 that is different from the surface S2, as the antenna to be used. Accordingly, the user holds the surface S1 over the communication apparatus 90, which allows the electronic apparatus 10 to perform communication with the communication apparatus 90.

FIGS. 7A and 7B are diagrams each illustrating an operation of the electronic apparatus 10 in the case where the electronic apparatus 10 is placed on the communication apparatus 90. FIG. 7A illustrates an example in the case where the electronic apparatus 10 is disposed such that the surface S2 of the electronic apparatus 10 comes into contact with the communication apparatus 90, and FIG. 7B illustrates an example in the case where the electronic apparatus 10 is disposed such that the surface S1 of the electronic apparatus 10 comes into contact with the communication apparatus 90.

In these examples, the user does not wear the electronic apparatus 10. Therefore, the acceleration sensor 14 detects that the electronic apparatus 10 does not move, and the pulse sensor 15 detects that the surface S2 of the electronic apparatus 10 is not in contact with or in proximity to the user. The controller 16 determines that the user does not wear the electronic apparatus 10, on the basis of these detection results.

As illustrated in FIG. 7A, in the case where the electronic apparatus 10 is disposed such that the surface S2 of the electronic apparatus 10 conies into contact with the communication apparatus 90, the acceleration sensor 14 detects that the surface S2 faces down. The controller 16 determines the lower antenna 12 of the antennae 11 and 12 as the antenna to be used, on the basis of the detection result of the acceleration sensor 14. Further, the controller 16 controls the connection section 2.0 to couple the antenna 12 and the communicator 30 together. The communicator 30 then performs communication with the communication apparatus 90 through the antenna 12.

Moreover, in the case where the electronic apparatus 10 is disposed such that the surface S1 of the electronic apparatus 10 comes into contact with the communication apparatus 90 as illustrated in FIG. 7B, the acceleration sensor 14 detects that the surface S1 faces down. The controller 16 selects the lower antenna 11 of the antennae 11 and 12 as the antenna to be used, on the basis of the detection result of the acceleration sensor 14. Further, the controller 16 controls the connection section 20 to couple the antenna 11 and the communicator 30 together. The communicator 30 then performs communication with the communication apparatus 90 through the antenna 11.

As described above, in the case where the user does not wear the electronic apparatus 10, the electronic apparatus 10 selects the lower antenna of the antennae 11 and 12 as the antenna to be used, on the basis of the orientation of the electronic apparatus 10 detected by the acceleration sensor 14. In other words, in the case where the user does not wear the electronic apparatus 10, the electronic apparatus 10 performs communication when being placed on the communication apparatus 90 in this example. At this time, it is easy for the lower antenna of the antennae 11 and 12 to be coupled to the antenna 91 of the communication apparatus 90 through a magnetic field. Therefore, in the case where the user does not wear the electronic apparatus 10, the electronic apparatus 10 selects the lower antenna. of the antennae 11 and 12 as the antenna to be used. Accordingly, the user places the electronic apparatus 10 on the communication apparatus 90, which allows the electronic apparatus 10 to perform communication with the communication apparatus 90.

In addition, since the plurality of antennae (the two antennae 11 and 12 in this example) are provided in the electronic apparatus 10, it is possible to enhance convenience of the user. In other words, for example, in a case where only one antenna is provided, it is necessary for the user to bring the surface provided with the antenna close to the communication apparatus 90. That is, it is necessary for the user to be aware of an orientation of the electronic apparatus in order to perform communication. In contrast, since the plurality of antenna are provided in the electronic apparatus 10, it is possible to perform communication with use of the antenna closer to the communication apparatus 90, of the plurality of antennae. Therefore, it is unnecessary for the user to be aware of the orientation of the electronic apparatus, which makes it possible to enhance convenience of the user.

Further, since the electronic apparatus 10 selects one of the plurality of antennae, on the basis of the detection results of the sensors (the acceleration sensor 14 and the pulse sensor 15), it is possible to achieve a simple configuration. In other words, for example, in a case where a configuration is employed in which communication is first performed with sequential use of a plurality of antennae and an antenna to be used is selected on the basis of respective receiving levels thereof, it is necessary to provide a receiving level comparison section, a controller that executes algorism to switch the antennae, and so forth, which may complicate the configuration. In contrast, in the electronic apparatus 10, since one of the plurality of antennae is selected on the basis of the detection results of the sensors, for example, it is unnecessary to perform communication in advance, which makes it possible to achieve a simple configuration.

[Effects]

As described above, in the present embodiment, the plurality of antennae are provided. Hence, it is possible to enhance convenience of the user.

In the present embodiment, one of the plurality of antennae is selected, on the basis of the detection result of the sensor. Hence, it is possible to achieve a simple configuration.

[Modification 1]

The so-called wearable apparatus of a wrist band type is used as the electronic apparatus 10 in the above-described embodiment; however, this is non-limiting, and various electronic apparatuses may be used. A case of using a ring wearable apparatus is described in detail below as an example.

FIG. 8 is a diagram illustrating a configuration example of a communication system 1A according to the present modification. The communication system 1A includes an electronic apparatus 10A and a communication apparatus 90A. The electronic apparatus 10A is a ring wearable apparatus. The communication apparatus 90A is a conical communication apparatus to which the ring electronic apparatus 10A is settable as illustrated in FIG. 8. The electronic apparatus 10A includes the two antennae 11 and 12.

FIG. 9 is a diagram illustrating an operation of the electronic apparatus 10A in a case where the user wears the electronic apparatus 10A. In this example, the user wears the electronic apparatus 10A and the surface S2 is in contact with or in proximity to the user. A controller 16A relating to the electronic apparatus 10A determines that the user wears the electronic apparatus 10A, on the basis of the detection results of the acceleration sensor 14 and the pulse sensor 15. The controller 16A then selects the antenna 11 disposed on the surface S1 as the antenna to be used.

FIG. 10 is a diagram illustrating an operation of the electronic apparatus 10A in a case where the electronic apparatus 10A is set to the communication apparatus 90A. In this example, the controller 16A determines that the user does not wear the electronic apparatus 10, on the basis of the detection results of the acceleration sensor 14 and the pulse sensor 15. At this time, the acceleration sensor 14 detects that the surfaces S1 and S2. face sideways. The controller 16A selects the antenna 12 disposed on the surface S2 that faces toward the inner side of the ring, as the antenna to be used, on the basis of the detection result of the acceleration sensor 14.

[Modification 2]

The pulse sensor 15 is provided in the above-described embodiment; however, this is non-limiting, and any sensor may be provided as long as the sensor detects that the sensor is in contact with or in proximity to the user. Specifically, a temperature sensor 15B may be provided, for example, as with an electronic apparatus 10B illustrated in FIG. 11. The electronic apparatus 10B includes the temperature sensor 15B and a controller 16B. The temperature sensor 15B detects a body temperature of the user wearing the electronic apparatus 10B, thereby detecting that the electronic apparatus 10B is in contact with or in proximity to the user. The controller 16B controls the connection section 20, on the basis of the detection results of the acceleration sensor 14 and the temperature sensor 15B.

[Modification 3]

The two antennae 11 and 12 are provided in the above-described embodiment; however, this is non-limiting. Alternatively, for example, three or more antennae may be provided. FIG. 12 is a diagram illustrating a configuration example of an electronic apparatus 10C including three antennae. The electronic apparatus 10C includes three antennae 11 to 13, a controller 16C, and a connection section 20C. For example, the antennae 11 to 13 may be disposed on respective surfaces different from one another of a housing of the electronic apparatus 10C. The controller 16C controls the connection section 20C, on the basis of the detection results of the acceleration sensor 14 and the pulse sensor 15. The connection section 20C couples one of the antennae 11 to 13 to the communicator 30 on the basis of instruction from the controller 16C.

[Modification 4]

The acceleration sensor 14 and the pulse sensor 15 are provided in the above-described embodiment; however, this is non-limiting. Alternatively, the pulse sensor 15 may not be provided, for example, as with an electronic apparatus 10D illustrated in FIG. 13. The electronic apparatus 10D includes a controller 16D. The controller 16D controls the connection section 20, on the basis of the detection result of the acceleration sensor 14. More specifically, as illustrated in FIG. 14, the controller 16D selects, on the basis of motion by the user to hold the electronic apparatus 10D over the communication apparatus 90 detected by the acceleration sensor 14, an antenna corresponding to the holding-over direction (the antenna 11 in this example) out of the two antennae 11 and 12, as the antenna to be used.

[Modification 5]

The technology is applied to the communication system in the above-described embodiment; however, this is non-limiting. Alternatively, for example, the technology may be applied to a power feeding system. A power feeding system 2 according to the present modification is described in detail below.

FIG. 15 is a diagram illustrating a configuration example of the power feeding system 2. The power feeding system 2 includes an electronic apparatus 40 and a power feeder 80. The electronic apparatus 40 includes two antennae 41 and 42 in this example. The antennae 41 and 42 are coupled to an unillustrated antenna of the power feeder 80 through a magnetic field. The electronic apparatus 40 selectively uses one of the two antennae 41 and 42, thereby receiving a supply of power from the power feeder 80.

FIG. 16 is a diagram illustrating a configuration example of the electronic apparatus 40 according to the present modification. The electronic apparatus 40 includes a controller 46, a power receiver 50, and a secondary battery 9.

The controller 46 controls the connection section 20, on the basis of the detection results of the acceleration sensor 14 and the pulse sensor 15. In addition, the controller 46 has a function of enabling or disabling the power receiver 50. Specifically, the controller 46 determines whether the user wears the electronic apparatus 10, on the basis of the detection results of the acceleration sensor 14 and the pulse sensor 15. In a case where the user wears the electronic apparatus 10, the controller 46 disables a function of the power receiver 50. This makes it possible to reduce power consumption. In contrast, in a case where the user does not wear the electronic apparatus 10, the controller 46 enables a function of the power receiver 50, and controls the connection section 20 to couple the lower antenna of the antennae 41 and 42 and the power receiver 50 together, on the basis of the detection result of the acceleration sensor 14.

The power receiver 50 includes a rectifier 51, a regulator 52, and a charging controller 53. The rectifier 51 rectifies a power signal that is fed from the power feeder 80 through one of the antennae 41 and 42. The regulator 52 generates DC power, on the basis of an output voltage of the rectifier 51. The charging controller 53 controls feeding, to the secondary battery 9, of the DC power fed from the regulator 52, thereby controlling the charge operation to the secondary battery 9. The secondary battery 9 stores the DC power fed from the regulator 52, and is configured of, for example, a rechargeable battery such as a lithium ion battery.

FIGS. 17A and 17B are diagrams each illustrating an operation of the electronic apparatus 40 in a case where the electronic apparatus 40 is placed on the power feeder 80. FIG. 17A illustrates an example of a case where the electronic apparatus 40 is disposed such that the surface S2 of the electronic apparatus 40 comes into contact with the power feeder 80. FIG. 17B illustrates an example of a case where the electronic apparatus 40 is disposed such that the surface S1 of the electronic apparatus 40 comes into contact with the power feeder 80.

As illustrated in FIG. 17A, in the case where the electronic apparatus 40 is disposed such that the surface S2 of the electronic apparatus 40 comes into contact with the power feeder 80, the acceleration sensor 14 detects that the surface S2 faces down. The controller 46 selects the lower antenna 42 of the antennae 41 and 42 as the antenna to be used, on the basis of the detection result of the acceleration sensor 14. Further, the controller 46 controls the connection section 20 to couple the antenna 42 and the power receiver 50 together. The power receiver 50 then receives, through the antenna 42, the power signal fed from the power feeder 80.

Further, as illustrated in FIG. 17B, in the case where the electronic apparatus 40 is disposed such that the surface S1 of the electronic apparatus 40 comes into contact with the power feeder 80, the acceleration sensor 14 detects that the surface S1 faces down. The controller 46 selects the lower antenna 41 of the antennae 41 and 42 as the antenna to be used, on the basis of the detection result of the acceleration sensor 14. Further, the controller 46 controls the connection section 20 to couple the antenna 41 and the power receiver 50 together. The power receiver 50 then receives, through the antenna 41, the power signal fed from the power feeder 80.

[Modification 6]

The technology is applied to the communication system in the above-described embodiment; however, this is non-limiting. Alternatively, for example, the technology may be applied to a communication system having a power feeding function. Electronic apparatuses 10E and 10F relating to the communication system are described below.

FIG. 18 is a diagram illustrating a configuration example of the electronic apparatus 10E. The electronic apparatus 10E includes the antennae 11 and 12, a connection section 20A, the communicator 30, the antennae 41 and 42, a connection section 20B, the power receiver 50, the secondary battery 9, the acceleration sensor 14, the pulse sensor 15, and a controller 16E.

The antennae 11 and 12 are antennae used for communication. The antenna 11 is disposed on the surface S1 of the electronic apparatus 10E, and the antenna 12 is disposed on the surface S2 opposite to the surface S1. The connection section 20A couples one of the antennae 11 and 12 to the communicator 30, on the basis of instruction from the controller 16E.

The antennae 41 and 42 are antennae used for power receiving. The antenna 41 is disposed on the surface S1 of the electronic apparatus 10E, and the antenna 42 is disposed on the surface S2 opposite to the surface S1. The connection section 20B couples one of the antennae 41 and 42 the power receiver 50, on the basis of instruction from the controller 16E.

The controller 16E selects one of the antennae 11 and 12 and selects one of the antennae 41 and 42, on the basis of the detection results of the acceleration sensor 14 and the pulse sensor 15. At this time, it is possible for the controller 16 to separately select the antenna to be used for communication and the antenna to be used for power receiving. Specifically, for example, in a case where the antenna 11 is selected, the controller 16E may select the antenna 41 or may select the antenna 42. Likewise, for example, in a case where the antenna 12 is selected, the controller 16E may select the antenna 41 or may select the antenna 42.

FIG. 19 is a diagram illustrating a configuration example of the electronic apparatus 10F. The electronic apparatus 10F includes the antennae 11 and 12, the connection section 20A, the connection section 20B, the communicator 30, the power receiver 50, the secondary battery 9, the acceleration sensor 14, the pulse sensor 15, and a controller 16F.

The antennae 11 and 12 are antennae used for communication and power receiving. In other words, the antennae 11 and 12 used for the communication and the antennae 41 and 42 used for the power receiving are separately provided in the electronic apparatus 10E (FIG. 18). However, the antennae 11 and 12 are used for both the communication and the power receiving in the electronic apparatus 10F (FIG. 19). The antenna 11 is disposed on the surface S1 of the electronic apparatus 10F, and the antenna 12 is disposed on the surface S2 opposite to the surface S1. The connection section 20A couples one of the antennae 11 and 12 to the communicator 30, on the basis of instruction from the controller 16F. The connection section 20B couples one of the antennae 11 and 12 to the power receiver 50, on the basis of instruction from the controller 16F.

The controller 16F selects one of the antennae 11 and 12, on the basis of the detection results of the acceleration sensor 14 and the pulse sensor 15. At this time, it is possible for the controller 16 to separately select the antenna to be used for the communication and the antenna to be used for the power receiving. Specifically, for example, in a case where the antenna 11 is coupled to the communicator 30, the controller 16F may couple the antenna 11 to the power receiver 50 or may couple the antenna 12 to the power receiver 50. Likewise, for example, in a case where the antenna 12 is coupled to the communicator 30, the controller 16F may couple the antenna 12 to the power receiver 50 or may couple the antenna 11 to the power receiver 50.

[Other Modification]

Moreover, two or more of the modifications may be combined.

Hereinbefore, although the technology has been described with reference to the embodiment and some modifications, the technology is not limited to the embodiment and the modifications, and may be variously modified.

For example, the acceleration sensor 14 is provided in the above-described embodiment; however a gyroscope or an angular velocity sensor may be provided in place of or together with the acceleration sensor 14.

Note that the effects described in the present specification are illustrative and non-limiting, and there may be any other effect.

Note that the technology may have the following configurations.

(1) A communication apparatus including:
one or a plurality of sensors;
a communicator that performs proximity wireless communication; and
a connection section that couples one of a plurality of antennae to the communicator, on a basis of a detection result of the one or the plurality of sensors.

(2) The communication apparatus according to (1), in which
the plurality of antennae includes a first antenna,
the one or the plurality of sensors includes a first sensor that is disposed near the first antenna and detects contact or proximity of a user, and
the connection section couples one of the plurality of antennae other than the first antenna to the communicator in a case where the first sensor detects the contact or the proximity of the user.

(3) The communication apparatus according to (2) in which the first sensor includes a pulse sensor.

(4) The communication apparatus according to (2), in which the first sensor includes a temperature sensor.

(5) The communication apparatus according to any one of (2) to (4), in which
the plurality of antennae further includes a second antenna, and
the connection section couples the second antenna to the communicator in the case where the first sensor detects the contact or the proximity of the user.

(6) The communication apparatus according to any one of (2) to (5), in which
the one or the plurality of sensors includes a second sensor that detects an orientation of the communication apparatus, and
the connection section couples, on a basis of a detection result of the second sensor, one of the plurality of antennae to the communicator in a case where the first sensor does not detect the contact or the proximity of the user.

(7) The communication apparatus according to (6), in which the second sensor includes an acceleration sensor.

(8) The communication apparatus according to (1), in which
the one or the plurality of sensors includes a second sensor that detects an orientation of the communication apparatus, and
the connection section couples one of the plurality of antennae to the communicator, on a basis of a detection result of the second sensor.

(9) The communication apparatus according to (1), in which
the plurality of antennae includes a first antenna,
the one or the plurality of sensors includes a third sensor that detects motion of a user, and
the connection section couples one of the plurality of antennae other than the first antenna to the communicator in a case where the third sensor detects the motion of the user.

(10) The communication apparatus according to (9), in which the connection section couples, to the communicator, an antenna of the plurality of antennae that is disposed at a position corresponding to a direction of the motion detected by the third sensor.

(11) The communication apparatus according to (9) or (10), in which the third sensor includes an acceleration sensor.

(12) The communication apparatus according to any one of (1) to (11), further including a power receiver, in which the connection section couples one of the plurality of antennae to the power receiver, on the basis of the detection result of the one or the plurality of sensors.

(13) The communication apparatus according to (12), in which, out of the plurality of antennae, an antenna to be coupled to the communicator and an antenna to be coupled to the power receiver are same.

(14) A power receiving apparatus including:
one or a plurality of sensors;
a power receiver that wirelessly receives power; and
a connection section that couples one of a plurality of antennae to the power receiver, on a basis of a detection result of the one or the plurality of sensors.

(15) An antenna switching method including:
operating one or a plurality of sensors; and
coupling, on a basis of a detection result of the one or the plurality of sensors, one of a plurality of antennae to a communicator that performs proximity wireless communication.

This application is based upon and claims the benefit of priority of the Japanese Patent Application No. 2015-89108 filed with the Japan Patent Office on Apr. 24, 2015, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A communication apparatus comprising:
one or a plurality of sensors;
a communicator that performs proximity wireless communication; and
a connection section that couples one of a plurality of antennae to the communicator, on a basis of a detection result of the one or the plurality of sensors, wherein
the plurality of antennae includes a first antenna,
the one or the plurality of sensors includes a first sensor that is disposed nearer to the first antenna than to one of the plurality of antennae other than the first antenna, and detects contact or proximity of a user, and
the connection section couples the one of the plurality of antennae other than the first antenna to the communicator in a case where the first sensor detects the contact or the proximity of the user.

2. The communication apparatus according to claim 1, wherein the first sensor comprises a pulse sensor.

3. The communication apparatus according to claim 1, wherein the first sensor comprises a temperature sensor.

4. The communication apparatus according to claim 1, wherein
the plurality of antennae further includes a second antenna, and
the connection section couples the second antenna to the communicator in the case where the first sensor detects the contact or the proximity of the user.

5. The communication apparatus according to claim 4, wherein
the communication apparatus further comprises a housing including a first surface and a second surface opposite the first surface,
the first antenna is disposed at the first surface, and
the second antenna is disposed at the second surface.

6. The communication apparatus according to claim 1, wherein
the one or the plurality of sensors includes a second sensor that detects an orientation of the communication apparatus, and
the connection section couples, on a basis of a detection result of the second sensor, one of the plurality of antennae to the communicator in a case where the first sensor does not detect the contact or the proximity of the user.

7. The communication apparatus according to claim 6, wherein the second sensor comprises an acceleration sensor.

8. The communication apparatus according to claim 1, wherein
the one or the plurality of sensors includes a second sensor that detects an orientation of the communication apparatus, and
the connection section couples one of the plurality of antennae to the communicator, on a basis of a detection result of the second sensor.

9. The communication apparatus according to claim 1, wherein
the one or the plurality of sensors includes a third sensor that detects motion of a user, and
the connection section couples one of the plurality of antennae other than the first antenna to the communicator in a case where the third sensor detects the motion of the user.

10. The communication apparatus according to claim 9, wherein the connection section couples, to the communicator, an antenna of the plurality of antennae that is disposed at a position corresponding to a direction of the motion detected by the third sensor.

11. The communication apparatus according to claim 9, wherein the third sensor comprises an acceleration sensor.

12. The communication apparatus according to claim 1, further comprising a power receiver, wherein
the connection section couples one of the plurality of antennae to the power receiver, on the basis of the detection result of the one or the plurality of sensors.

13. The communication apparatus according to claim 12, wherein, out of the plurality of antennae, an antenna to be coupled to the communicator and an antenna to be coupled to the power receiver are same.

14. The communication apparatus according to claim 1, wherein the connection section decouples the first antenna from the communicator in the case where the first sensor detects the contact or the proximity of the user.

15. The communication apparatus according to claim 1, further comprising an attachment section configured to attach to a wrist of the user.

16. The communication apparatus according to claim 1, further comprising an attachment section configured to attach to a finger of the user.

17. A power receiving apparatus comprising:
one or a plurality of sensors;
a power receiver that wirelessly receives power; and
a connection section that couples one of a plurality of antennae to the power receiver, on a basis of a detection result of the one or the plurality of sensors, wherein
the plurality of antennae includes a first antenna,
the one or the plurality of sensors includes a first sensor that is disposed nearer to the first antenna than to one of the plurality of antennae other than the first antenna, and detects contact or proximity of a user, and
the connection section couples one of the plurality of antennae other than the first antenna to the power receiver in a case where the first sensor detects the contact or the proximity of the user.

18. An antenna switching method comprising:
operating one or a plurality of sensors including a first sensor that detects contact or proximity of a user; and
coupling, on a basis of a detection result of the one or the plurality of sensors, one of a plurality of antennae to a communicator that performs proximity wireless communication, including coupling, in a case where the first sensor detects the contact or the proximity of the user, one of the plurality of antennae other than the first antenna to the communicator, wherein the first sensor is disposed nearer to the first antenna than to one of the plurality of antennae other than the first antenna.

* * * * *